United States Patent [19]

Stettner

[11] Patent Number: 5,475,225

[45] Date of Patent: * Dec. 12, 1995

[54] AUTORADIOGRAPHIC DIGITAL IMAGER

[75] Inventor: Roger Stettner, Santa Barbara, Calif.

[73] Assignee: Advanced Scientific Concepts Inc., Santa Barbara, Calif.

[*] Notice: The portion of the term of this patent subsequent to Mar. 24, 2009, has been disclaimed.

[21] Appl. No.: 856,019

[22] Filed: Mar. 23, 1992

Related U.S. Application Data

[63] Continuation-in-part of Ser. No. 325,137, Mar. 17, 1989, Pat. No. 5,099,128, and Ser. No. 506,948, Apr. 9, 1990, Pat. No. 5,140,162.

[51] Int. Cl.$^6$ .................................................. H01L 31/115
[52] U.S. Cl. ................................................................. 250/370.11
[58] Field of Search .............................. 250/370.11, 332, 250/370.09

[56] References Cited

U.S. PATENT DOCUMENTS

| | | | |
|---|---|---|---|
| 4,067,104 | 1/1978 | Tracy | 29/854 |
| 4,931,647 | 6/1990 | Hiruma et al. | 250/368 |
| 5,099,128 | 3/1992 | Stettner | 250/370.11 |
| 5,140,162 | 8/1992 | Stettner | 250/370.09 |

OTHER PUBLICATIONS

Koh–ichi Mochiki, Ken–ichi Hasegawa and Shuji Namatame, "Amorphous Silicon Position–Sensitive Detector." *Nuclear Instruments and Methods in Physics Research*, vol. A273 (1988) pp. 640–644 Copyright © Elsevier Science Publishers B.V.

*Primary Examiner*—Constantine Hannaher
*Attorney, Agent, or Firm*—Gottlieb, Rackman & Reisman

[57] ABSTRACT

A real-time autoradiographic digital imager for accurately quantifying the spatial distribution of radio pharmaceuticals in tissue samples having a sensor for converting the energy of radionuclide particles to an electrical signal, external off-chip electronics for sensor timing and signal conditioning, a computer for data processing and image display and a high voltage supply to support the sensor operations. The sensor has a scintillator or phosphor for converting particle energy to lower energy photons, a microchannel plate high-resolution-amplifier for amplifying the photon signal, and a readout chip structure for converting the photon signal to an electrical signal. The readout chip structure consists of a detector array for converting the photons to an electrical charge, and a readout array for storing the data and providing the data, with low noise, to the output portion of the external electronics. The detector array and readout array are electrically connected by conducting bumps; the detector array is composed of detectors, and the readout array is composed of unit cells. Each unit cell is associated with a single detector in the detector array and contains readout electronics which produce data in response to radiation from tissue samples. Both the readout and external electronics provide the data in digitized form, in real-time, to a processing computer and CRT display.

26 Claims, 10 Drawing Sheets

AUTORADIOGRAPHIC DIGITAL IMAGER

BACKGROUND OF THE INVENTION

This application is a continuation-in-part of application Ser. No. 325,137, filed Mar. 17, 1989 now U.S. Pat. No. 5,099,128, issued Mar. 24, 1992 and of application Ser. No. 506,948, filed Apr 9, 1990, now U.S. Pat. No. 5,140,162, issued Aug. 18, 1992.

The invention relates to autoradiography, in particular to apparatus and methods for determining the spatial and energy distributions of tissue-specimen radioactive-tracers (radiopharmaceutical or radionuclide). More specifically this invention relates to a radiation sensor employing a microchannel plate high-resolution-amplifier, a novel solid-state detector array and an integrated-circuit chip hybrid configuration, with external electronics to support data read out in real-time. These features enable a very sensitive apparatus having high-resolution and large dynamic range.

Currently, in the investigation of tissue-specimen radio-active-tracer spatial-distributions, there is a need for a simple to use digital autoradiographic imager with high resolution and a large dynamic range, which can also be monitored in real time as the image forms. In addition there is also a need for such an imager which can distinguish between different radionuclides in a tissue sample.

Autoradiography is a well known technique for determining the distribution of substances in tissues. It is an essential component of the technique of radioimmunotherapy (RIT), using antibodies to target therapeutic amounts of radionuclides to tumors. The goal of RIT is sterilization of all tumor stem cells or, where they cannot be identified, all tumor cells. A detailed knowledge of the variation in dose at the cellular level will lead to a rationale for the optimization of RIT. There can be considerable regional fluctuations in tumor dose arising from variations in accessibility of the immunoconjugate into different regions of the tumor and also because of heterogeneity of tumor antigen expression. In clinical practice, biopsy samples are examined to determine the distribution of activity within the tumor. In RIT, autoradiography is necessary to quantify the amount of radionuclide absorbed by the tumor and other tissue.

Photographic film has been used since the 1920's to evaluate the spatial distribution of radioactive-tracers in tissue specimens. The major advantage of film autoradiography is high spatial-resolution—smaller than 10 µm. However, the shortcomings of film radiography are extensive. Typically, tissue specimens have to be dipped in a molten emulsion and hung to dry in a dark, temperature controlled environment leaving a 3–6 µm thick emulsion coating on the specimen. The difficulty of obtaining reproducible and uniform emulsion layers across multiple sections limits the method. The thickness of the emulsion layer at the bottom of a slide coated with dipping-emulsion is usually thicker than at the top. Since emulsion thickness determines film sensitivity, variations in this thickness leads to photographic emmulsion grain density changes across the specimen. Attempts to overcome this difficulty using stripping film (a constant emulsion thickness on a paper backing) give rise to other difficulties arising from the variation in film contact with the specimen during the drying process. Furthermore, film autoradiographic methods suffer from false images due to artifacts caused by pressure, fixative or enzymatic interactions (unfixed frozen tissues).

Apart from these difficulties in processing, film autoradiography has additional limitations associated with film imaging. A frustrating and ultimately costly problem is the poor dynamic range (typically 2.5 decades) and nonlinearity of film. Because the specimen's local radioactivity is not known in advance, the specimen can easily under or over-expose the film resulting in a sub-optimal image and a loss of spatial radionuclide data. Consequently the ability to obtain information on absolute activity distributions in tissue samples is severely limited by the dynamic range of the film and the necessity to meticulously regulate and perform a number of complex steps. Furthermore those methods which rely on film autoradiographs as input data require microdensiometers or image analyzers for the objective quantification of grain densities. Such approaches require careful calibration, are costly, slow and are readily subject to inaccuracies in the grain density areas approaching film saturation. For these reason very few scientists use autoradiography for absolute tissue activity determinations. The analysis of autoradiographics from animal or patient tissues is most frequently limited to subjective visual inspection to determine if the radiopharmaceutical localized where it was intended.

As a result, the autoradiographic procedure employing photographical film is a trial and error method. Samples coated with the emulsion are stored during an exposure in a refrigerator. Rarely does the investigator know the optimum time for development. This necessitates repeated development of some of the slides at periodic intervals to prevent inadvertent under or over-exposure of the emulsion. Since image acquisition is in competition with latent image fading, the dose response of the film imposes severe limitations on the comparison of different studies.

Present autoradiographic alternatives to film are unsatisfactory. Storage Phosphor Technology (SPT) is currently the most attractive alternative to film autoradiography, but has much less than optimum spatial-resolution, time-resolution and sensitivity. In the SPT technique, biopsies are positioned on an SPT imaging plate and after an indefinite time the biopsy is removed and the image digitally read off the plate.

The process is similar to, but more convenient than using film and the SPT technique has a much higher dynamic range but poorer resolution than film. The SPT image plate can be reused and the image is directly digitized when it is removed from the plate. However, SPT still suffers from some of the same drawbacks as film. If the image plate is underexposed, reading out the image destroys the image; and SPT is not a real-time imaging system. Because SPT has a resolution that is much poorer than that of film, it is not useful when dose information at the near-cellular level is desired.

The SPT imaging plate consisting of a layer of multicrystalline barium fluoride doped with europium. The crystals are encapsulated in polyurethane. Absorption of radioactive decay particles in the plate results in the formation of stable high-energy electron states. These states comprise a latent image. A He-Ne laser is used in a scanning mode to destabilize the electron states resulting in the formation of photons. These photons are collected and transported to a photomultiplier tube (an amplifier system) via long fiber optic cables. The photomultiplier tube amplifies the photon signal and converts it to an electrical signal which is digitized and stored as the image data. The laser-beam scanner spot size is the major cause of insufficient resolution. Photon loss in the optical collection and transport system inherently reduce sensitivity.

There are other disadvantages of SPT. The imaging plate is typically covered with an 8 µm cellulose acetate film. This means that alpha particles and low energy beta emitter nuclides cannot penetrate the covering and therefore cannot be used with SPT. This eliminates the use of nuclides such as Tritium and the Auger electrons of iodine 125, which have proven useful with film. Additionally, because of its low sensitivity, SPT technology is relatively unresponsive to even those beta particles which get through the cellulose acetate layer but do not have the energy required to form part of the minimum latent image. Many nuclear disintegrations may be required to obtain a minimal latent image. This results in increased exposure time for lower energy beta emitters.

Another feature of SPT which is a disadvantage is its inability to differentiate between different radionuclides in specimens that contain more than one radionuclide. Currently dual isotope autoradiography employing two radionuclides of differing range emissions requires a film having two layers of emulsion separated by an inert mylar spacer. This introduces an even greater level of complexity into an already very difficult experimental procedure. Therefore, in spite of the potential usefulness of dual isotope research, the autoradiographic procedure is not often used.

Techniques exists for digitization of film by CCD linear arrays. This is accomplished by scanning across film autoradiograms. However, it is not an acceptable technique for directly obtaining an autoradiogram from a tissue sample. At any instant of time only a small portion of the sample can be monitored by the moving detectors. Most counts are not counted by the moving detector, which increases the required exposure time for an image.

An accurate and reliable technique to quantify the microdistribution of the radiopharmaceutical in the tissues, such as the current invention, would be valuable.

BRIEF DESCRIPTION OF THE PRESENT INVENTION

This invention is a simply-applied and accurate instrument for determining RIT dose distribution at the cellular level (about 10 microns (μm)). It can also be applied in other real-time energy resolving autoradiographic applications, requiring high spatial-resolution, high-sensitivity, and a large dynamic range. The number of emissions detected by the sensor 2 (FIG. 1) over a given time, as a function of spatial position on the sensor front surface 8 quantitatively measures the spatial distribution of the radiopharmaceutical absorbed by the tissue. The development of the image can be monitored in real-time on a cathode ray tube screen. Image quality increases as the observation time increases because more radionuclide decays occur and are processed. The radioactive particle emissions from the tissue sample 1 (FIGS. 1 and 2) can be alpha particles, electrons, gamma-rays and x-rays generated by Auger electrons. However, due to the very large path length of most gamma-rays and x-rays, alpha particles and electron emissions are usually most effective for high-resolution autoradiographic imaging.

High-sensitivity is desirable in autoradiographic imaging because radionuclides emitting lower particle energies can be utilized, because higher spatial-resolution can be achieved when an Anger camera imaging mode is employed, and because higher energy-resolution is possible. The number of visible light photons produced in the scintillator/ phosphor 9 (FIG. 2) by the radiopharmaceutical particle radiation, and later detected in the readout chip structure 11 is directly related to the sensitivity of the invention. (Visible light photons can also be produced in the input window 15 if it is made of scintillator fibers.) The ADI will have high-sensitivity since few photons will be lost due to the short and direct optical path from the scintillator/phosphor to the high-resolution amplifier. The number of photons produced is directly related to the energy lost in scintillator/ phosphor by the particle radiation and the energy required to produce a photon. For higher energy particles more energy is lost in the scintillator/phosphor by making it thicker. A denser scintillator/phosphor reduces radiation path length and therefore, all other parameters remaining equal, will increase resolution. The optimum scintillator material therefore depends upon the type of radiopharmaceutical employed and the resolution and sensitivity required by the application.

Because of the ADI speed it distinguishes individual disintegrations and therefore the signal amplitude can be used to distinguish different radionuclides, via energy resolution. Operation is very similar to Anger cameras used in nuclear medicine where gamma-rays scattered in the tissue are removed from the image by energy resolving the individual gamma-ray photon scintillations. The ADI signal amplitude is proportional to the energy absorbed in the scintillator and the energy resolution is related to the statistics of the scintillation photons. Enough scintillator-photons are produced to resolve different radionuclides. Anger camera operations also improve spatial-resolution above that of the individual dimensions.

It is an object of the present invention to provide a sensor for autoradiographic applications having high spatial-resolution, high time-resolution, high energy resolution, large dynamic range, and direct digitization, that functions in real-time, together with external drive and output processing electronics.

It is a further object of the present invention to provide a direct readout, real-time hybrid integrated circuit readout array structure for detection, storage and readout of data generated by radionuclide decays having high spatial-resolution, and high time-resolution.

It is a still further object of the present invention to provide an improved method for determining the spatial distribution of different radionuclides in the same tissue sample.

DETAILED DESCRIPTION OF A PREFERRED EMBODIMENT OF THE INVENTION

Figure 1:
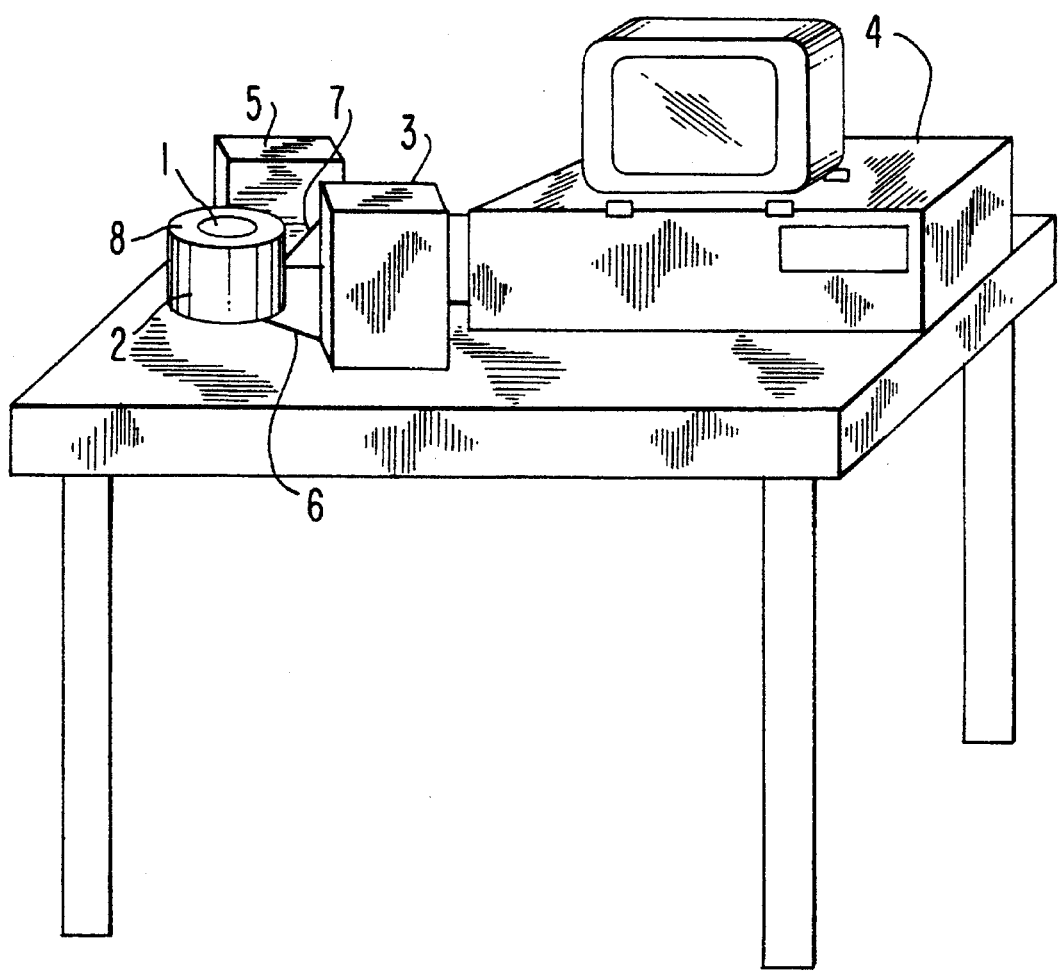
FIG. 1 is a perspective view of the preferred embodiment of the Autoradiographic Digital Imager (ADI) in position to image a tissue specimen.

A preferred embodiment of the present invention, the Autoradiographic Digital Imager (ADI) depicted in FIG. 1, is designed to sense and digitize radioactive emissions from the tissue samples 1 that have absorbed radiopharmaceuticals or radionuclides. Four parts make up the preferred embodiment of the invention; a sensor 2 that detects the particle emissions from radionuclide decays, external electronics 3 that controls the sensor data read out timing and the sensor data digitization and conditioning, a computer 4 for processing sensor data in order to develop an image from the data in real-time and a high voltage supply 5 required for sensor operation. A cable 6 connects the sensor with the external electronics and another cable 7 connects the sensor with a high voltage supply.

Figure 2:
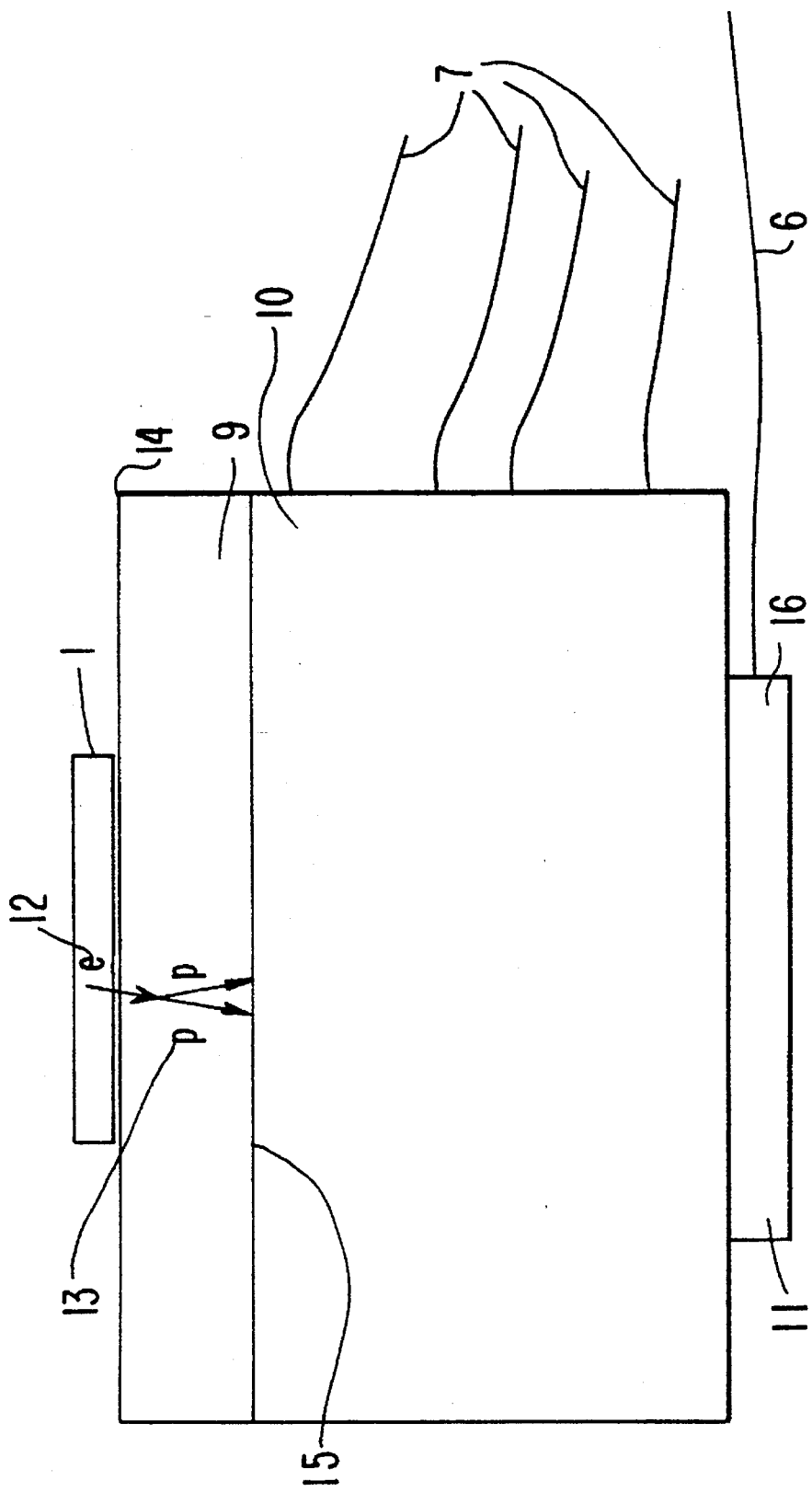
FIG. 2 is a cross section of the sensor of the present invention with a tissue sample in position for imaging.

FIG. 2 shows in more detail the sensor 2 of the present invention. The sensor is comprised of a scintillator/phosphor 9, a high-resolution-amplifier 10 and a readout chip structure 11.

Radionuclide emissions 12 generated in the tissue specimen 1 interact with the scintillator or phosphor 9, herein generally referred to as a scintillator, producing visible-light photons 13. A thin layer of material 14, which may be an evaporated metal such as aluminum, can be present on the front surface of the scintillator to increase the efficiency of the sensor by reflecting escaping photons back towards the high-resolution-amplifier, or by absorbing the photons 13, and by modifying the particle emission so its energy can be more easily absorbed. The scintillator may be considered to comprise the thin layer together with the scintillating material or phosphor. The visible-light photons enter the input window 15 of the high-resolution-amplifier 10. This window may contain scintillator fibers. Inside the high-resolution-amplifier the photons are converted to electrons, the electrons are amplified and then converted back to photons. The amplified photon signal exits the high-resolution-amplifier through the amplifier output window 16 and is detected, converted to a voltage and stored in the readout chip structure 11. Stored signal voltages are read out of the sensor 2 by means of the sensor cable 6 and external electronics 3. High voltages required for high-resolution-amplifier operation are carried by the high-resolution-amplifier cable 7.

Figure 3:
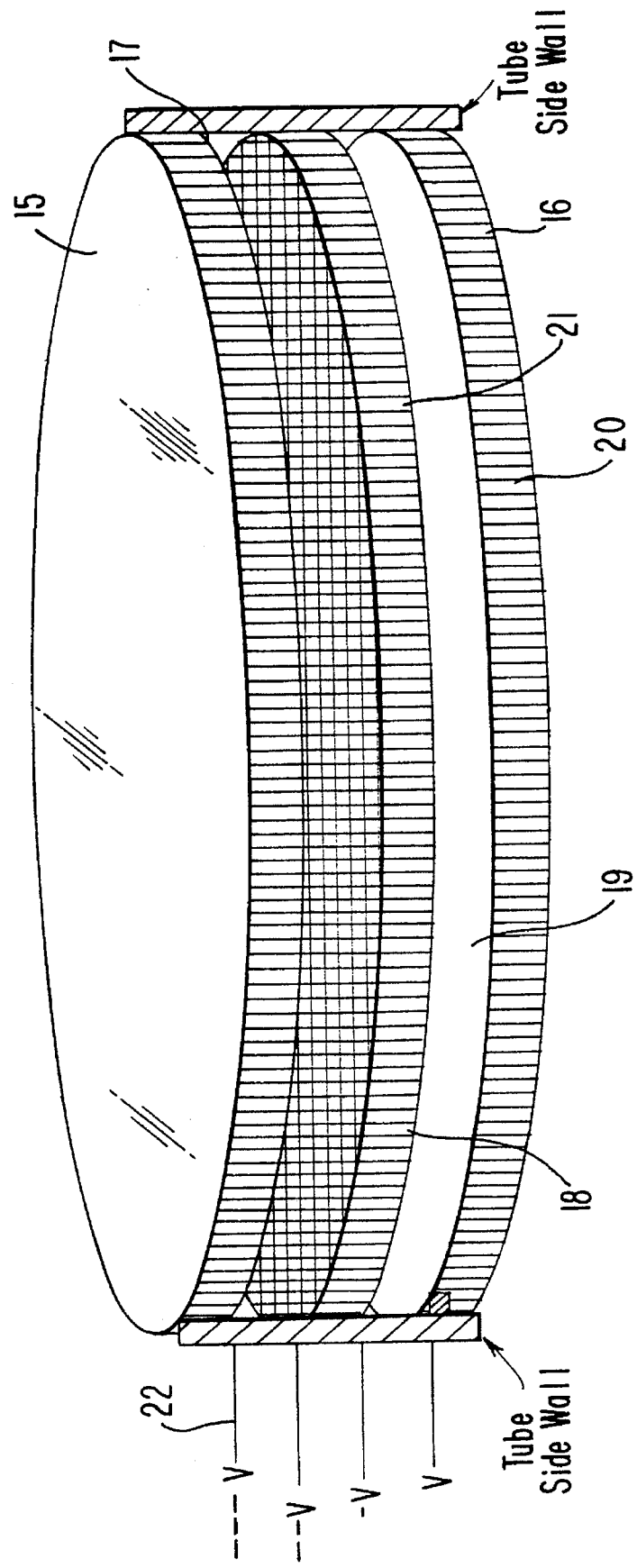
FIG. 3 is a detailed perspective view of the high resolution amplifier of the present invention.

FIG. 3 shows a detailed perspective view of the high-resolution-amplifier 10 of the sensor 2 of the present invention. The high-resolution amplifier 10 may be referred to as a high-resolution microchannel plate image tube. The high-resolution-amplifier 10 is necessary to increase the signal level above the noise so that a single scintillator-photon can be detected. This performance maximizes the sensitivity and resolution of the invention. Practically this amounts to saying that a single photoelectron from the photocathode is detectable. To achieve this the gain is greater than the noise generated by the instrument itself.

The high-resolution-amplifier 10 is comprised of five major components; a high-resolution fiber optic input window 15 (the optic fibers may be scintillator optic fibers); a photocathode 17 on the back surface of the input window; a high-resolution microchannel plate 18; a small-particle phosphor screen 19 coated on its front surface with a photon reflective or absorptive surface; and a high-resolution fiber optic output window 16. The phosphor screen is positioned at the top surface of the output window. For high-resolution imaging, nominal center to center spacing of the individual optical fibers 20 in the input and output windows and center to center spacing of the individual channels 21 in the microchannel plate are less than 10 microns.

Scintillator-photons enter the high-resolution amplifier 10 via the fiber optic input window 15 (or may be created in the scintillator optic fibers) and are restricted from spreading (hence maintaining high-resolution) by the individual fibers 20 of the window. The photons then interact with the photocathode 17 at the bottom of the input window creating photoelectrons. The photocathode must be matched to the energy of the photons generated in the scintillator. Therefore the high-resolution-amplifier 10, scintillator/phosphor and metal layer 14 are designed as a system which can be optimized with respect to a particular radiopharmaceutical. A preferred photocathode is an S-20 photocathode comprising Sb-K-Na-Cs. Photoelectrons are accelerated from the photocathode 17 into the microchannel plate 18 by the voltage 22 difference ((--V)– (---V)) which is preferably a few hundred volts. The photoelectrons increase their numbers by secondary emission in the microchannel plate 18 and this process continues throughout the microchannel plate channel until an amplification of about 1000 fold is reached. Amplification requires a voltage difference ((-V)–(--V)) of a few thousand volts and is dependent in ways known to persons skilled in the art upon the material surface of the channel and the angle the accelerating electron makes with the channel wall. The amplification process in each channel is analogous to the amplification in a photomultiplier tube except that the energy required to produce a secondary electron is less in the microchannel plate. After leaving the microchannel plate 18 the electrons are accelerated by the voltage difference (V– (-V)) into the phosphor screen 19 creating tens of photons for each electron. The voltage difference is large enough so that the electrons can penetrate the photon reflective or absorbtive surface, for example, an evaporated aluminium or dielectric surface, with enough energy left over to create a substantial number of photons and therefore additional amplification. The distance between the microchannel plate 18 and the output window 16 is minimal, on the order of 100–1000 microns for high-resolution and the voltage difference between these two structures must be low enough to prevent arcing, typically hundreds to thousands of volts.

Figure 4:
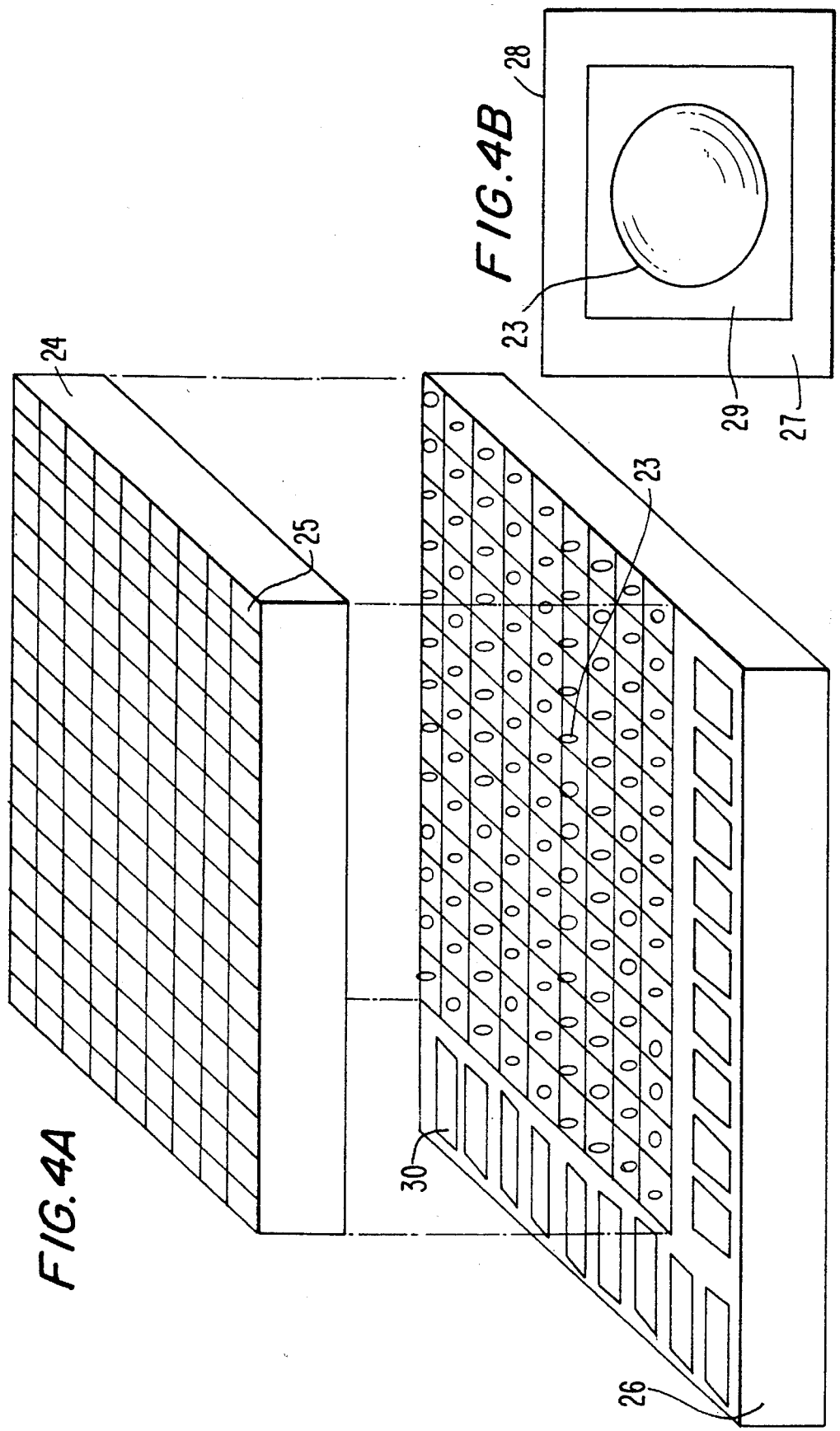
FIG. 4a is a detailed perspective view of the readout structure hybrid configuration.
FIG. 4b shows a blowup diagram of a unit cell in the readout array.

The readout chip structure 11 depicted in FIG. 2 and, in detail, in FIG. 4a comprises two chips hybridized together using conducting bumps 23. Indium is an example of a conducting bump. The technology of Indium bumping is known in hybrid infrared focal plane technology. The upper chip, namely the detector array 24, in the hybrid assembly is in physical contact with and optically coupled to the high-resolution-amplifier output window 16. The detector array 24 is preferably an array of individual P intrinsic N (PIN) diodes 25. For high-resolution the linear dimension of these diodes is small (20 microns, for example) and there is not enough room next to the diode to put readout circuitry (monolithic construction). The lower chip, namely the readout array 26, in the hybrid construction contains all the readout circuitry 27 (see FIG. 4b) and is electrically connected to the detector array 24 via the conducting bumps 23. Each diode in the array is connected to its own readout circuitry located in a unit cell 28 on the lower chip (see FIG. 4b). The conducting bump is electrically connected to the circuitry by means of a metal bump pad 29 and the readout array is connected to the external electronics by means of wire bond pads 30. The readout circuitry may be placed under the bump pad to increase the space available for the readout circuitry without using the space needed for the bump pad.

Figure 5:
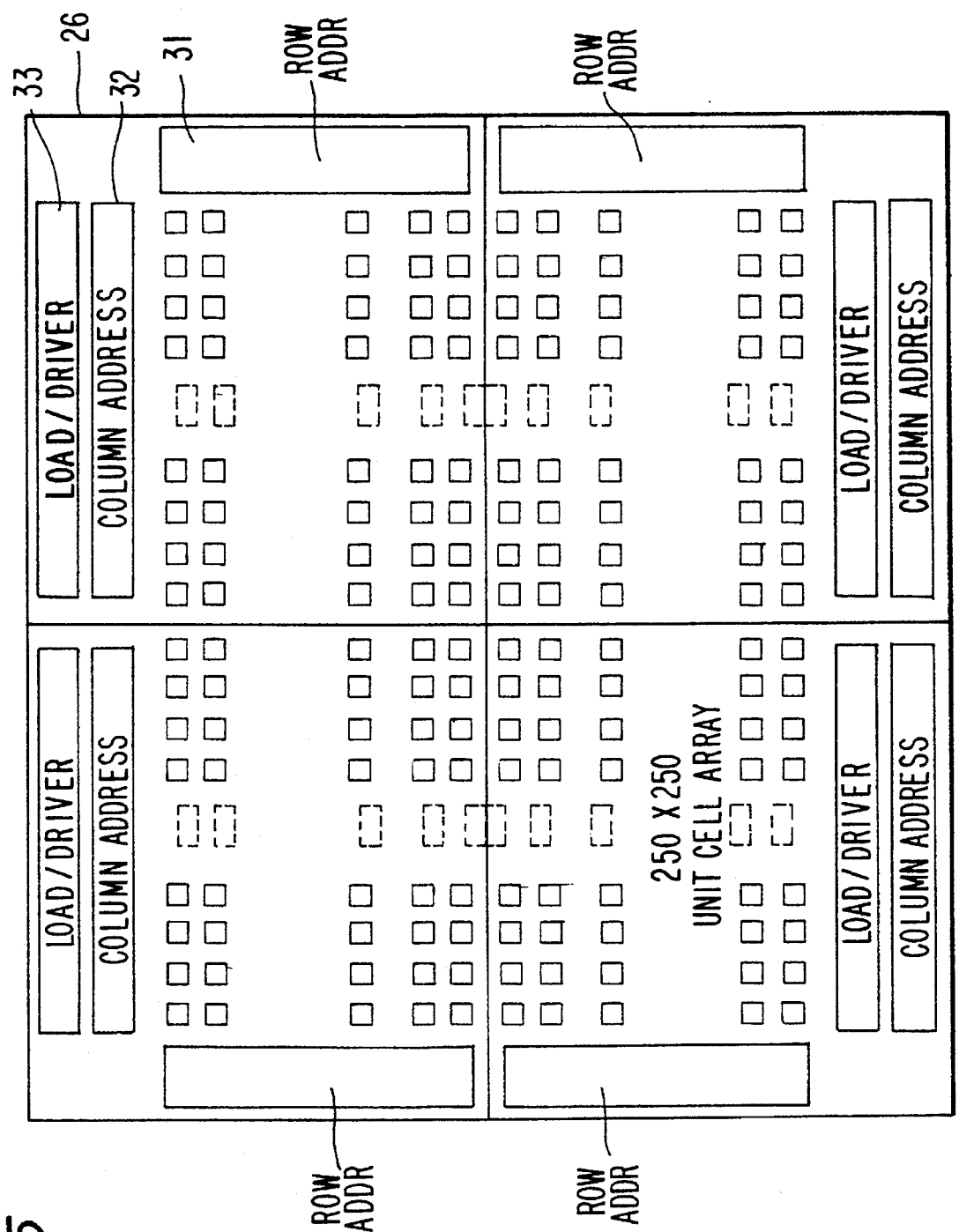
FIG. 5 is a detailed top view of the readout array layout.

FIG. 5 shows the readout array 26 layout for a 500× 500 array with a 20 micron spacing between unit cells (UC's) 28. The number of unit cells (or pixels) and unit cell center to center spacing could be larger or smaller depending upon the resolution and specimen size requirements. The readout array is comprised of four independently integrated detector/ readout arrays providing four separate output signals. This is a high-speed configuration. A single output would suffice for lower speed requirements. High-speed read out allows individual radioactive decays to be distinguished so that the present invention can be used in an Anger camera mode for enhanced spatial-resolution and for discrimination of radionuclides in the tissue sample by energy-resolution. More than four outputs are possible and the appropriate number would depend upon the number of pixels in the array and the maximum activity of the tissue specimens.

A preferred thickness of scintillator 9, (FIG. 2) for high-resolution imaging is 10–20 microns, more preferably 10 microns. Typical scintillator/phosphor materials are sodium iodide, bismuth germanate and P-20 phosphor (zinc cadmium sulfide with silver doping). Phosphor materials are composed of particles and these particles must be small for high-resolution. The front surface layer 14 (FIG. 2) can increase sensitivity in two ways. Emitted particles with too high an energy to be effectively absorbed by the scintillator/ phosphor are reduced in energy or converted to a more efficiently absorbed particle in the layer. In addition the layer acts as a photon reflector, increasing sensitivity by preventing photon loss or can act as a photon absorber. Material type, density and thickness of the layer depend upon the radionuclide emission and the scintillator/phosphor material. The layer must be thin enough so that the emitted particle, either directly or through conversion, deposits a maximum of its energy in the scintillator but thick enough to be durable and reflect photons. Typically the layer will not be thicker than the range of the emitted particle in the layer. A very thin layer may not be appropriate where high durability is required and may be omitted.

In the FIGS. 4a and 4b hybrid structure, the readout unit cell 28 electronics is directly beneath its detector (PIN diode preferred) element 25. This innovative hybrid technique lends itself to very small unit cell sizes which translates to high-resolution. The detector area is the same as the readout unit cell area, 18 μm×18 μm, as depicted in the FIG. 5 blowup. For the detector array 24, preferred center to center detector spacing is 20 microns with a dead space of about 2 microns between detectors. For the readout array the row 31 and column address decoders 32 along with the output load and driver 33 take up some valuable chip area and this is the principal reason for the additional area required on the sides of the chip. Overall chip size will be about 1.2 cm×1.2 cm for a nominal 1 cm$^2$ active area.

Figure 6:
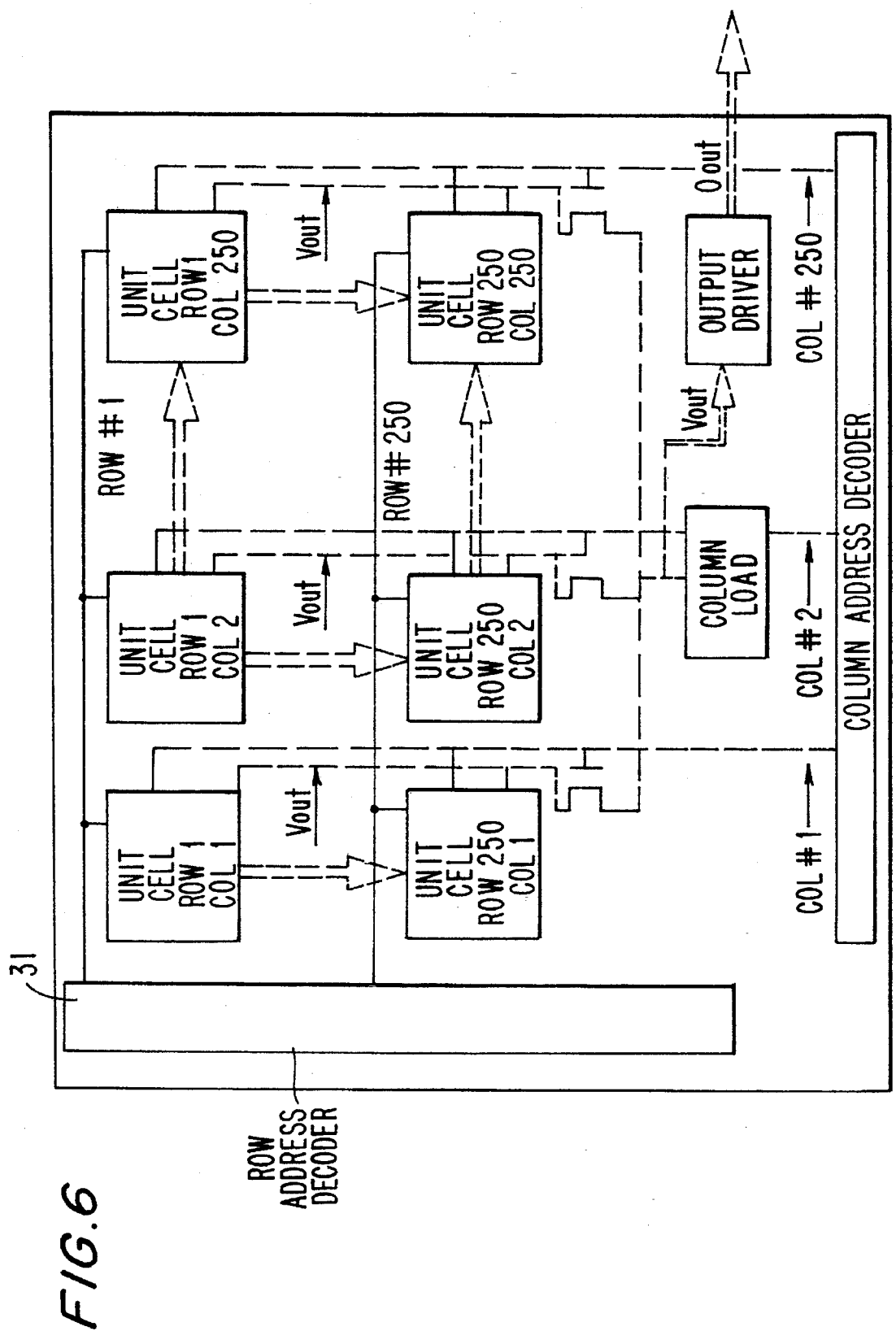
FIG. 6 depicts the readout array address multiplexing.

The function of the address decoders 31, 32 is to assure a unique output signal for each and every detector element in a timely manner. Address decoder multiplexing is shown in FIG. 6. As compared to a CCD approach, the unique aspect of this decoder is that the unit cell readout has to drive only one row and one column output line. Because of the limited drive capability of each unit cell readout, high sensitivity requires that the unit cell drive the lowest capacitance possible, one row and one column line.

Figure 7:
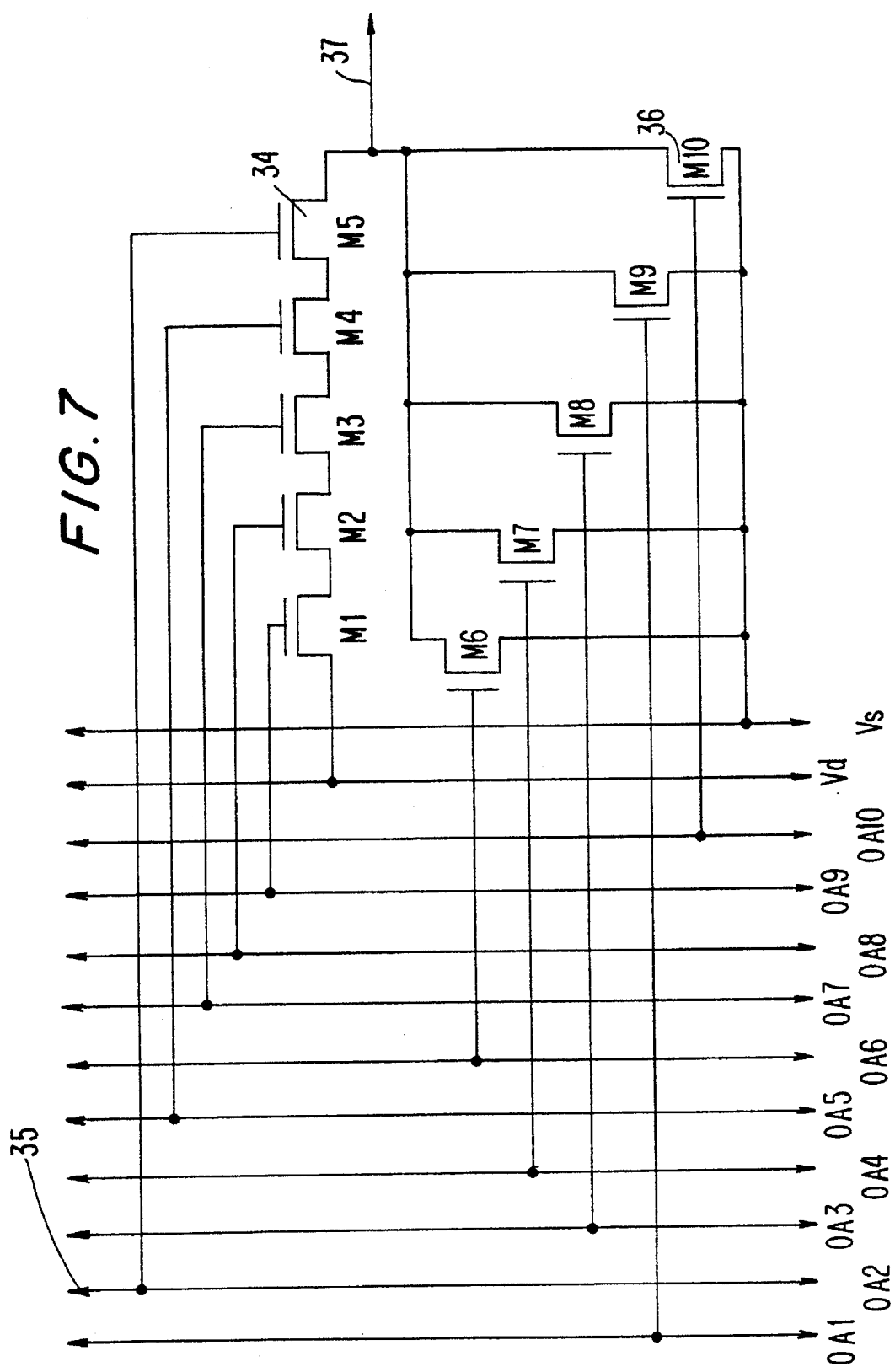
FIG. 7 depicts a single row or column address decoder circuit.

A single row/column address decoder is shown in FIG. 7. This circuit is a 10 choose 5 decoder requiring 10 address lines to select 250 combinations. Five address MOSFET's 34 select the desired row/column through the use of ten address lines 35. The address pulldown MOSFET's 36 select the inverse of the above. In this way, the select line 37 is never floating but is held low until it is addressed. The address decoder in FIG. 7 shows only one possible address code out of a possible 252 combinations.

Figure 8:
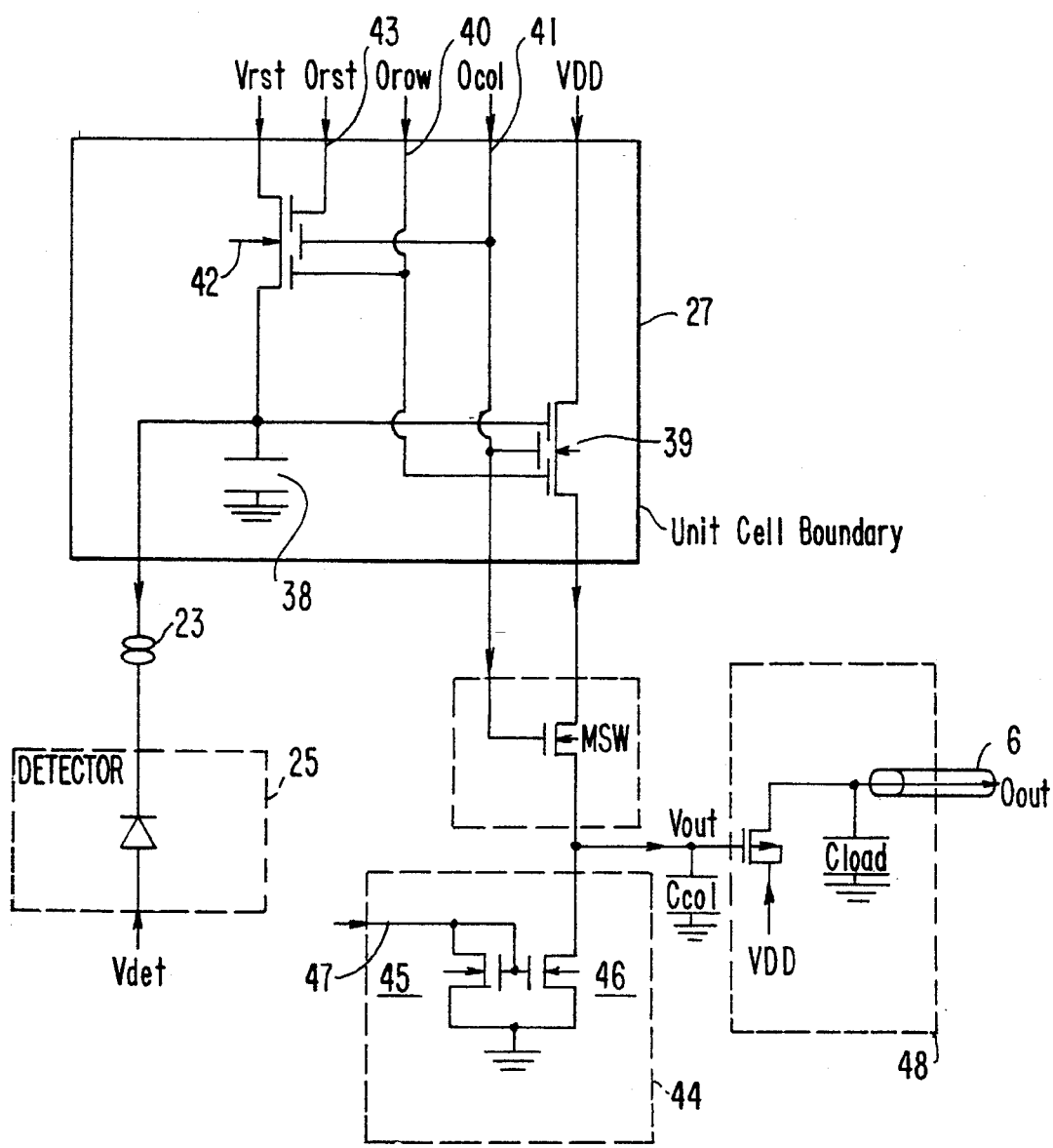
FIG. 8 shows the readout array unit cell circuit.

The basic purpose of the readout circuit 27, in each unit cell 28 of the readout array (see FIGS. 4 and 5) is to deliver the detector signal to the external electronics and keep the signal to noise ratio as high as possible. The readout circuit design chosen for this unit cell is shown in FIG. 8. The preferred readout chip employs the direct readout approach (NON-CCD) which incorporates a switched capacitor per detector readout multiplexer circuitry. This unit cell circuit represents a new design approach in meeting the required small unit cell size. The direct readout approach reduces noise, therefore increasing sensitivity, and dramatically reduces susceptibility to radiation induced upset. Since the present invention detects radiation, susceptibility to radiation induced upsets is very undesirable. High-sensitivity is required in the present invention for high spatial and energy resolution. Photons from the high-resolution-amplifier output window 16 (see FIGS. 2 and 3) are collected by the detector array 24, outside of the evacuated tube, in the readout structure 11 (FIG. 2). These photons are converted into electrons (electron-hole pairs) in the detectors 25 and transferred via the conducting bump 23 to a readout unit cell 28. The readout unit cell uses these electrons to discharge the sense capacitor 38 (FIG. 8) thereby sensing individual radionuclide disintegrations. As is obvious from the two-chip hybrid design, the sense capacitor is distinct from any detector capacitance.

The selected readout employs a source follower per detector to achieve low noise and wide dynamic range. The highest resolution expected from the current invention requires that the detector element size be restricted to about 20 μm×20 μm area. This area constraint greatly limits the number of transistors in each unit cell. Two three gate (trigate) transistors are used in each unit cell for highest resolution applications because of their small size. One trigate transistor acts as a source follower 39 while also serving a unit cell selection function; the specific unit cell source follower is selected via pulses (φrow and φcol) on the row 40 and column 41 select lines. The second trigate transistor, the reset transistor 42, is used for resetting the value of the sense capacitor 38 and is specifically selected via the same row 40 and column 41 select lines.

A data cycle starts when the detector/sense capacitor reset pulse [φrst], on the reset line 43 is turned off in the unit cell allowing detector current to be integrated on the sense capacitor 38. At the end of the integration period, the address decoder selects the unit cell through the row 40 and column 41 select lines with pulses [φrow] and [φcol]. This enabling allows the source follower MOSFET 39 to sense the charge on the sense capacitor 38 and generate an appropriate source follower voltage [Vout]. The voltage on the sense capacitor is first clamped, and is then reset to its initial (pre-signal) value. The reset transistor 42 performs this reset function when reset pulse [φrst] is applied. After resetting the detector/sense capacitor, the voltage is sampled completing the data gathering cycle. This cycle is repeated for each row and column addressed. The difference in the output shortly before and after reset is proportional to the sense capacitor/detector discharge. The time required to service each unit cell is approximately 150 nanoseconds for a 12 bit digital output. The load 44 for the unit cell source followers is placed outside the unit cell 28 (FIG. 5) for simplicity and column data uniformity. There is one source follower load 44 for each column and it is generated by the combination of MOSFET's 45 and 46 forming a current mirror 44. The current in line 47 will be mirrored in MOSFET 46.

The function of the readout current driver circuit 48 depicted in the extreme right hand box of FIG. 8 is to deliver the readout signal [Vout] to the external electronics. The cable 6 (FIG. 1) capacitance from the sensor 2 to the external electronics 3 may be too large for a source follower output driver to handle. Under these circumstances, instead of sensing voltage as a signal, the external electronics will sense current and then convert this signal to voltage.

Figure 9:
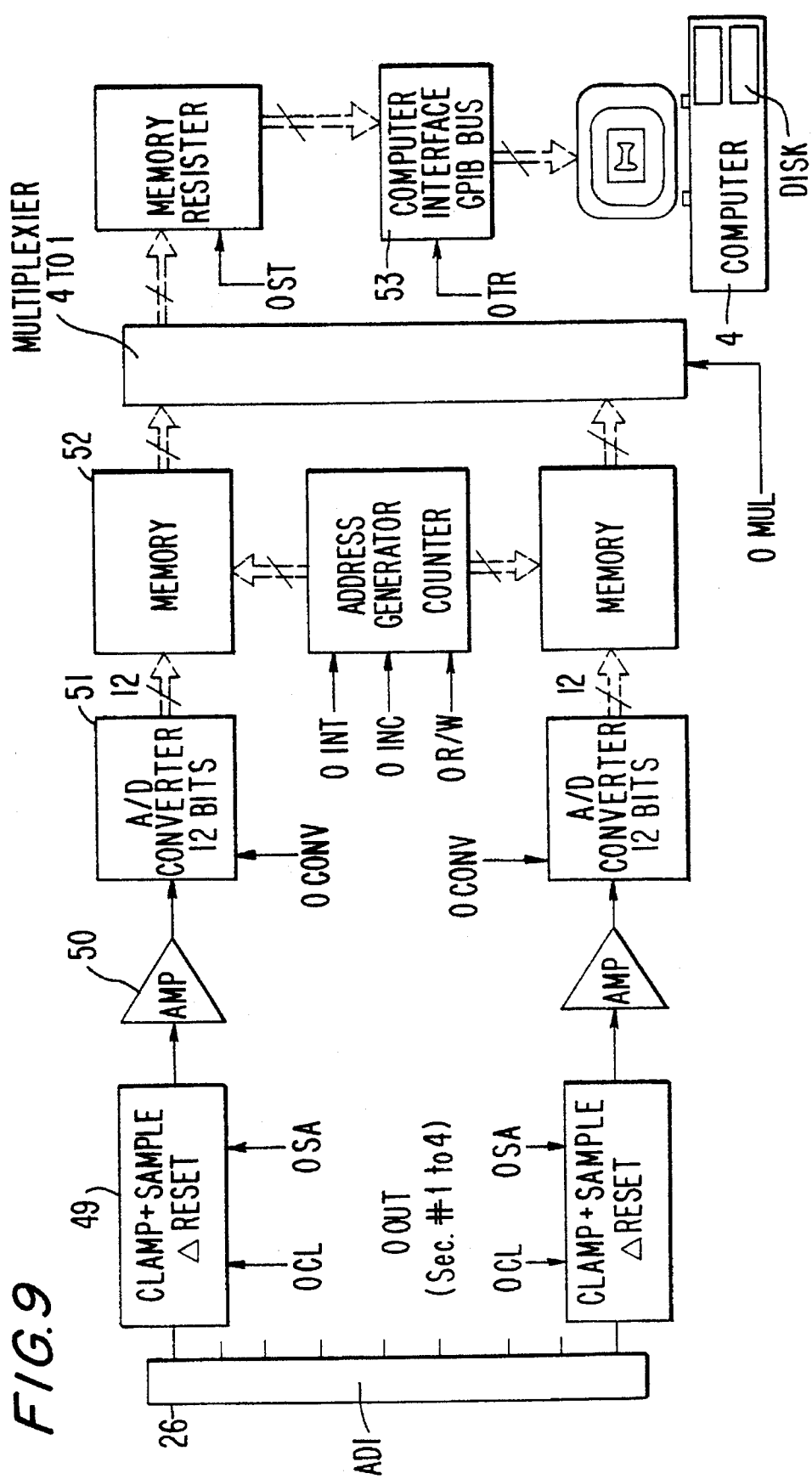
FIG. 9 is a block diagram of the Output Electronics.

The external electronics is partitioned into two functional units, Output Electronics (OE) and the Drive Electronics (DE). The OE, depicted in FIG. 9, will process the incoming signal derived from each of the 4 sections of the readout array 26 (FIG. 5). The first stage of the OE unit consist of a clamp and sample circuit 49 which functions to extract the detector signal from the unit cell readout signal. This signal is then fed into a buffer/amplifier 50 to transform the signal to the proper voltage level for the 12 bit Analog to Digital (A/D) converter 51. The output of the buffer stage will feed directly into the 12 bit A/D converter 51 to give a dynamic range of 4096. Each of the 4 A/D's will have its own high speed buffer memory 52. This high speed memory will be used to hold A/D data during readout cycles. The image processing computer 4 will interface to the OE unit through a General Propose Interface Bus (GPIB) 53. This computer will serve to condition and process the data for enhanced imaging and graphic display. A color graphics terminal would display the image in real time, as it develops, and be able to archive images for storage and later use.

Since individual radionuclide decays are sensed by the present invention, the processing includes an Anger camera mode of operation where a photon distributor technique known to persons in this art is used to obtain resolutions higher than the unit cell dimension. The Anger camera operational mode is in addition to the more usual operational mode where individual pixel data from a given cycle is simply added to the sum of all the previous data for that pixel. Because each data cycle is independent of the previous data cycle, the dynamic range of the present invention is effectively infinite. If more than one radionuclide is present in the tissue, the radionuclides can be distinguished by an energy resolution technique similar to that used in Anger cameras. By summing all the pixel data associated with a given decay, after subtracting off dark current and adjusting for detector responsivity differences, the energy of the decay can be evaluated within the energy resolution of the device.

The function of the clamp and sample circuit 49 is to extract from the unit cell readout data the detector signal. This is accomplished by clamping the circuit to a known reference voltage at the time the detector signal is available. The signal is sampled after resetting the detector/sense capacitor to its original value. This action produces an output voltage that is equal to the difference in signal between the clamp and sample points.

Figure 10:
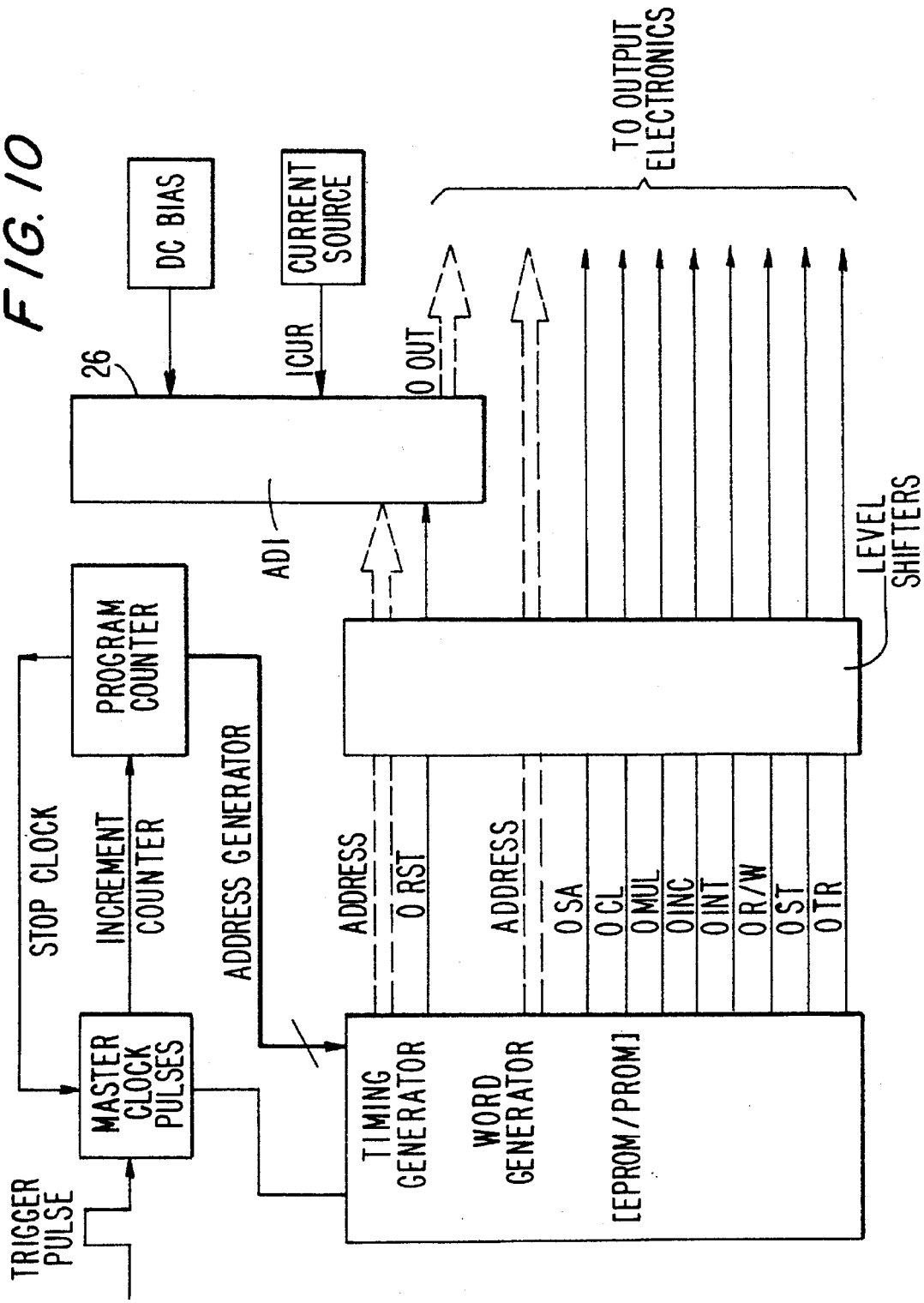
FIG. 10 is a block diagram of the Drive Electronics.

The DE, depicted in FIG. 10, serves to provide all of the necessary clocks and biases to drive each of the 4 readout array sections (FIG. 5) and also provide some critical timing pulses for the OE unit. The initiation of all DE start-up cycles and readout array data cycles is controlled by a trigger pulse at the start of an exposure. This trigger pulse will start a program counter used in starting and stopping of all data cycles. A data cycle consists of collecting detector data from a tissue sample and then reading out all of the readout array unit cells (pixels). Each unit cell is immediately reset after the data is read out so very little exposure time is lost. The program counter is driven by a master clock that controls the speed of all sensor electronic operations. Each timing generator word will drive clock lines and be programmed to represent the desired pattern of particular clock lines. The level shifter will then convert this Transistor Transistor Logic compatible clock to the required voltage level necessary to drive either the readout array or the OE unit. The speed at which each word is cycled through will be controlled by the master clock. One complete pass through the data cycle will be the same as cycling through all words. All clocks and biases generated by the DE unit will feed either the readout array or the OE unit.

Although the invention has been described by a detailed preferred embodiment it should be understood that the invention is not limited by the inessential components of that embodiment but is reflected in the following claims.

I claim:

1. A real-time autoradiographic digital radionuclide imager comprising a sensor, external off-chip electronics, a computer and a high voltage supply, said sensor comprising a scintillator having a thickness less than the penetration depth of the radionuclide particle in the scintillator, a microchannel plate high-resolution-amplifier and a readout chip structure, said readout chip structure comprising a detector array and readout array, said readout array comprising a plurality of unit cells, each associated with a single detector in the detector array and containing on-chip readout electronics adapted to change state in response to radiation from tissue samples, producing data indicative of the change of state, said readout and external electronics for timing and signal conditioning adapted to provide said data to said computer in digitized form in real time.

2. The autographic digital radionuclide imager of claim 1 for imaging a biopsy wherein the readout chip structure covers an area at least equal to the size of the biopsy.

3. The autoradiographic digital radionuclide imager of claim 1 wherein said scintillator comprises a layer exposed to said radionuclides placed at the input window of the microchannel plate high-resolution-amplifier, wherein said layer absorbes energy from the radionuclides and reflects or absorbs scintillator photons.

4. The autoradiographic radionuclide digital imager of claim 3, wherein the thickness and density of said layer and of said scintillator and the photon production efficiency of said scintillator provides sensitivity and resolution sufficient for a real time high resolution display.

5. The real time autoradiographic digital radionuclide imager of claim 4 wherein said layer is a metal layer and said scintillator thickness is less than about 100 µm.

6. The real time autoradiographic digital radionuclide imager of claim 4 wherein said layer is a metal layer and said scintillator thickness is less than about 25 µm.

7. The real time autoradiographic digital radionuclide imager of claim 4 wherein said unit cell dimension is less than about 50 µm.

8. The real time autoradiographic digital radionuclide imager of claim 4 wherein said unit cell dimension is less than about 30 µm.

9. The autoradiographic digital radionuclide imager of claim 1 wherein said scintillator comprises an input window that includes scintillator fibers.

10. The autoradiographic radionuclide digital imager of claim 1, each of said unit cells comprising a signal storage capacitor, wherein said each of capacitors is adapted to store a signal indicative of the energy of a radionuclide particle emission.

11. The autoradiographic digital radionuclide imager of claim 1, wherein said readout and external electronics is direct readout electronics adapted to provide said data in digitized form and in real-time.

12. A real-time autoradiographic digital radionuclide imager comprising a sensor, external off-chip electronics, a computer, and a high voltage supply, said sensor comprising a scintillator having a thickness less than the penetration depth of the radionuclide particle in the scintillator, a microchannel plate high-resolution-amplifier and a readout chip structure, said readout chip structure comprising a detector array and readout array, said readout array comprising a plurality of unit cells, each associated with a single detector in the detector array and containing on-chip readout electronics adapted to change state in response to radiation from tissue samples, producing data indicative of the change of state, said readout and external electronics for timing and signal conditioning adapted to provide said data to said computer in digitized form in real time, wherein said detector array and readout array are electrically connected by conducting bumps.

13. A real-time autoradiographic digital radionuclide imager comprising a sensor, external off-chip electronics, a computer, and a high voltage supply, said sensor comprising a scintillator having a thickness less than the penetration depth of the radionuclide particle in the scintillator, a microchannel plate high-resolution-amplifier and a readout chip structure, said readout chip structure comprising a detector array and readout array, said readout array comprising a plurality of unit cells, each associated with a single detector in the detector array and containing on-chip readout electronics adapted to change state in response to radiation from tissue samples, producing data indicative of the change of state, said readout and external electronics for timing and signal conditioning adapted to provide said data to said computer in digitized form in real time, each of said unit cells comprising a signal storage capacitor, wherein said each of capacitors is adapted to store a signal indicative of the energy of a radionuclide particle emission, each of said unit cells further comprising electronic means to enable selection of said unit cell prior to data readout and to reset said capacitor just after data readout and to enable selection and transfer of said the signal from said capacitor to said external electronics.

14. A multi-layered sensor having readout and external electronics, said sensor comprising an electron energy absorptive and photon reflecting or absorbing layer, a scintillator layer, a microchannel plate high-resolution amplifier and a readout chip structure comprising a readout array and a detector array, said readout array comprising a plurality of unit cells, each associated with a single detector in the detector array and containing readout electronics adapted to change state in response to radiation from tissue samples, producing data indicative of the change of state, said readout and external electronics, adapted to read out said data in digitized form in real time.

15. The multi-layered sensor of claim 14 for imaging a biopsy wherein the readout chip structure covers an area at least equal to the size of the biopsy.

16. The multi-layered sensor of claim 14 wherein said electron energy absorptive and photon reflective or absorbing layer is located on a surface of the scintillator layer and said scintillator layer is placed at the input window of the microchannel plate.

17. The multi-layered sensor of claim 16, wherein the thickness and density of said layer and of said scintillator and the photon production efficiency of said scintillator provides sensitivity and resolution sufficient for a real time high resolution display.

18. The multi-layered sensor of claim 14 wherein said scintillator comprises an input window that includes scintillator fibers.

19. The multi-layered sensor of claim 14, each of said unit cells comprising a signal storage capacitor, wherein each of said capacitors is adapted to store a signal indicative of a sensed particle.

20. The multi-layered sensor of claim 14, wherein said readout and external electronics is direct readout electronics adapted to provide said data in digitized form and in real-time.

21. A multi-layered sensor having readout and external electronics, said sensor comprising an electron energy absorptive and photon reflecting or absorbing layer, a scintillator layer, a microchannel plate high-resolution amplifier and a readout chip structure comprising a readout array and a detector array, said readout array comprising a plurality of unit cells, each associated with a single detector in the detector array and containing readout electronics adapted to change state in response to radiation from tissue samples, producing data indicative of the change of state, said readout and external electronics, adapted to read out said data in digitized form in real time, wherein the readout chip structure comprises a detector array and readout array electrically connected by conducting bumps.

22. A multi-layered sensor having readout and external electronics, said sensor comprising an electron energy absorptive and photon reflecting or absorbing layer, a scintillator layer, a microchannel plate high-resolution amplifier and a readout chip structure comprising a readout array and a detector array, said readout array comprising a plurality of unit cells, each associated with a single detector in the detector array and containing readout electronics adapted to change state in response to radiation from tissue samples, producing data indicative of the change of state, each of said unit cells comprising a signal storage capacitor, wherein each of said capacitors is adapted to store a signal indicative of the sensed particle, each of said unit cells further comprising electronic means to enable selection of said unit cell prior to data readout and to enable selection and transfer of said signal from said capacitor to said external electronics.

23. A readout chip structure comprising a two dimensional detector array and readout array electrically connected by conducting bumps, and external electronics, said detector array comprising a plurality of small detectors, said readout array comprising a plurality of small unit cells, each associated with a single detector in the detector array and containing readout electronics adapted to change state in response to radiation from tissue samples, producing data indicative of the change of state, said external electronics adapted to read out said data in digitized form in real time.

24. The readout chip structure of claim 23, said small unit cell comprising a signal storage capacitor, wherein said capacitor is adapted to store a signal indicative of the energy of radionuclide particle emission.

25. The readout chip structure of claim 24, said small unit cell further comprising electronic means to be selected prior to data readout and to reset said capacitor just after data readout and to select and transfer the signal from said capacitor to off-chip external electronics.

26. The readout chip structure of claim 23, wherein said readout electronics is direct readout electronics adapted to readout said data in digitized form and in real-time.

* * * * *